United States Patent
Iori et al.

(10) Patent No.: US 10,540,373 B1
(45) Date of Patent: Jan. 21, 2020

(54) CLAUSE LIBRARY MANAGER

(71) Applicant: JPMorgan Chase Bank, N.A., New York, NY (US)

(72) Inventors: Max E. Iori, Cos Cob, CT (US); Daryl Wooldridge, Lombardi, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 246 days.

(21) Appl. No.: 14/193,956

(22) Filed: Feb. 28, 2014

Related U.S. Application Data

(60) Provisional application No. 61/772,359, filed on Mar. 4, 2013.

(51) Int. Cl.
 *G06F 16/28* (2019.01)
(52) U.S. Cl.
 CPC .................. *G06F 16/285* (2019.01)
(58) Field of Classification Search
 CPC ......... G06F 17/30864; G06F 17/30988; G06F 17/30973; G06F 17/301; G06F 17/30873; G06F 17/30643; G06F 17/3082; G06F 17/30752; G06F 17/30598; G06F 16/285
 USPC ......................................................... 707/609
 See application file for complete search history.

(56) References Cited

U.S. PATENT DOCUMENTS

| | | |
|---|---|---|
| 3,872,448 A | 3/1975 | Mitchell, Jr. |
| 5,159,687 A | 10/1992 | Richburg |
| 5,168,444 A | 12/1992 | Cukor et al. |
| 5,202,986 A | 4/1993 | Nickel |
| 5,278,982 A | 1/1994 | Daniels et al. |
| 5,313,616 A | 5/1994 | Cline et al. |
| 5,347,518 A | 9/1994 | Lee |
| 5,455,946 A | 10/1995 | Mohan et al. |
| 5,471,613 A | 11/1995 | Banning et al. |
| 5,471,629 A | 11/1995 | Risch |
| 5,630,173 A | 5/1997 | Oprescu |
| 5,701,471 A | 12/1997 | Subramanyam |
| 5,748,878 A | 5/1998 | Rees et al. |
| 5,752,034 A | 5/1998 | Srivastava |
| 5,758,061 A | 5/1998 | Plum |

(Continued)

FOREIGN PATENT DOCUMENTS

| | | |
|---|---|---|
| WO | 95/03586 | 2/1995 |
| WO | 96/34350 | 10/1996 |
| WO | 02/046980 | 6/2002 |

OTHER PUBLICATIONS

Alin Deutsch et al, Storing Semistructured Data with Stored, ACM SIGMOD Rec., pp. 431-442 (1999).

(Continued)

*Primary Examiner* — Hosain T Alam
*Assistant Examiner* — Saba Ahmed
(74) *Attorney, Agent, or Firm* — Greenblum & Bernstein, P.L.C.

(57) ABSTRACT

Methods and systems for managing and maintaining a library including organized categories of legal clauses for access by a user in a network computing environment. A clause library manager is provided for identifying a clause for inclusion in a library including multiple clauses. A clause profile including identifying information associated with the clause is generated for the identified clause. A rating is determined for the clause and added to the clause profile. The clause is categorized into a clause category based on the clause profile.

10 Claims, 4 Drawing Sheets

(56) References Cited

U.S. PATENT DOCUMENTS

| | | |
|---|---|---|
| 5,764,972 A | 6/1998 | Crouse et al. |
| 5,774,553 A | 6/1998 | Rosen |
| 5,784,557 A | 7/1998 | Oprescu |
| 5,787,402 A | 7/1998 | Potter et al. |
| 5,828,883 A | 10/1998 | Hall |
| 5,832,523 A | 11/1998 | Kanai et al. |
| 5,835,770 A | 11/1998 | Shum et al. |
| 5,845,293 A | 12/1998 | Veghte et al. |
| 5,872,976 A | 2/1999 | Yee et al. |
| 5,907,846 A | 5/1999 | Berner et al. |
| 5,920,719 A | 7/1999 | Sutton et al. |
| 5,978,477 A | 11/1999 | Hull et al. |
| 6,009,405 A | 12/1999 | Leymann et al. |
| 6,012,087 A | 1/2000 | Frevald et al. |
| 6,014,671 A | 1/2000 | Castelli et al. |
| 6,026,237 A | 2/2000 | Berry et al. |
| 6,029,002 A | 2/2000 | Afifi et al. |
| 6,029,175 A | 2/2000 | Chow et al. |
| 6,058,393 A | 5/2000 | Meier et al. |
| 6,065,009 A | 5/2000 | Leymann et al. |
| 6,081,808 A | 6/2000 | Blackman et al. |
| 6,108,698 A | 8/2000 | Tenev et al. |
| 6,125,390 A | 9/2000 | Touboul |
| 6,138,112 A | 10/2000 | Slutz |
| 6,138,158 A | 10/2000 | Boyle et al. |
| 6,145,121 A | 11/2000 | Levy et al. |
| 6,163,776 A | 12/2000 | Periwal |
| 6,167,534 A | 12/2000 | Straathof et al. |
| 6,188,400 B1 | 2/2001 | House et al. |
| 6,226,652 B1 | 5/2001 | Precival et al. |
| 6,237,143 B1 | 5/2001 | Fontana et al. |
| 6,243,862 B1 | 6/2001 | Lebow |
| 6,256,635 B1 | 7/2001 | Arrouye et al. |
| 6,263,121 B1 | 7/2001 | Melen et al. |
| 6,266,683 B1 | 7/2001 | Yehuda et al. |
| 6,269,479 B1 | 7/2001 | Puram |
| 6,279,008 B1 | 8/2001 | Tung Ng et al. |
| 6,301,701 B1 | 10/2001 | Walker et al. |
| 6,311,320 B1 | 10/2001 | Jibbe |
| 6,311,327 B1 | 10/2001 | O'Brien et al. |
| 6,336,122 B1 | 1/2002 | Lee et al. |
| 6,356,920 B1 | 3/2002 | Vandersluis |
| 6,381,609 B1 | 4/2002 | Breitbart et al. |
| 6,385,618 B1 | 5/2002 | Ng et al. |
| 6,397,221 B1 | 5/2002 | Greef et al. |
| 6,405,209 B2 | 6/2002 | Obendorf |
| 6,411,957 B1 | 6/2002 | Dijkstra |
| 6,418,446 B1 | 7/2002 | Lection et al. |
| 6,418,448 B1 | 7/2002 | Sarkar |
| 6,418,451 B1 | 7/2002 | Maimone |
| 6,449,623 B1 | 9/2002 | Bohannon et al. |
| 6,453,310 B1 | 9/2002 | Zander |
| 6,456,995 B1 | 9/2002 | Salo et al. |
| 6,467,052 B1 | 10/2002 | Kaler et al. |
| 6,477,540 B1 | 11/2002 | Singh et al. |
| 6,487,545 B1* | 11/2002 | Wical .............. G06F 17/271 706/45 |
| 6,490,581 B1 | 12/2002 | Neshatfar et al. |
| 6,502,095 B2 | 12/2002 | Breitbart et al. |
| 6,502,104 B2 | 12/2002 | Fung et al. |
| 6,532,467 B1 | 3/2003 | Broclebank et al. |
| 6,535,894 B1 | 3/2003 | Schmidt et al. |
| 6,539,337 B1 | 3/2003 | Provan et al. |
| 6,539,383 B2 | 3/2003 | Charlet et al. |
| 6,539,397 B1 | 3/2003 | Doan et al. |
| 6,539,398 B1 | 3/2003 | Hannan et al. |
| 6,557,039 B1 | 4/2003 | Leong et al. |
| 6,564,048 B1 | 5/2003 | Sugita |
| 6,571,249 B1 | 5/2003 | Garrecht et al. |
| 6,574,640 B1 | 6/2003 | Stahl |
| 6,578,129 B1 | 6/2003 | da Silvan, Jr. |
| 6,591,260 B1 | 7/2003 | Scwarzhoff et al. |
| 6,601,075 B1 | 7/2003 | Haung et al. |
| 6,651,076 B1 | 11/2003 | Asano |
| 6,665,086 B2 | 12/2003 | Hull et al. |
| 6,678,705 B1 | 1/2004 | Brechtold et al. |
| 6,681,380 B1 | 1/2004 | Britton et al. |
| 6,691,139 B2 | 2/2004 | Ganesh et al. |
| 6,697,835 B1 | 2/2004 | Hanson et al. |
| 6,701,514 B1 | 3/2004 | Haswell et al. |
| 6,711,594 B2 | 3/2004 | Yano et al. |
| 6,714,219 B2 | 3/2004 | Lindhorst et al. |
| 6,763,384 B1 | 7/2004 | Gupta et al. |
| 6,880,010 B1 | 4/2005 | Webb et al. |
| 6,918,013 B2 | 7/2005 | Jacobs et al. |
| 6,920,467 B1 | 7/2005 | Yoshimoto |
| 6,934,934 B1 | 8/2005 | Osborne, II et al. |
| 6,938,072 B2 | 8/2005 | Berman et al. |
| 7,010,757 B2 | 3/2006 | Stana et al. |
| 7,376,642 B2* | 5/2008 | Nayak .............. G06F 17/30613 |
| 9,613,190 B2* | 4/2017 | Ford ................. G06F 21/10 |
| 10,255,283 B1* | 4/2019 | Cheng ............... G06F 3/0482 |
| 2002/0007287 A1 | 1/2002 | Straube et al. |
| 2002/0029228 A1 | 3/2002 | Rodriguez et al. |
| 2002/0038226 A1 | 3/2002 | Tyus |
| 2002/0038320 A1 | 3/2002 | Brook |
| 2002/0046235 A1* | 4/2002 | Foy .................. G06F 17/24 709/203 |
| 2002/0049666 A1 | 4/2002 | Reuter et al. |
| 2002/0065695 A1 | 5/2002 | Francoeur et al. |
| 2002/0083034 A1 | 6/2002 | Orbanes et al. |
| 2002/0091702 A1 | 7/2002 | Mullins |
| 2002/0116205 A1 | 8/2002 | Ankireddipally et al. |
| 2002/0143774 A1 | 10/2002 | Vandersluis |
| 2002/0144101 A1 | 10/2002 | Wang et al. |
| 2002/0178439 A1 | 11/2002 | Rich et al. |
| 2002/0188765 A1 | 12/2002 | Fong et al. |
| 2003/0014421 A1 | 1/2003 | Jung |
| 2003/0018666 A1 | 1/2003 | Chen et al. |
| 2003/0027561 A1 | 2/2003 | Iyer |
| 2003/0046313 A1 | 3/2003 | Leung et al. |
| 2003/0050931 A1 | 3/2003 | Harman et al. |
| 2003/0065644 A1 | 4/2003 | Horman et al. |
| 2003/0069975 A1 | 4/2003 | Abjanic et al. |
| 2003/0070158 A1 | 4/2003 | Lucas et al. |
| 2003/0074345 A1* | 4/2003 | Baldwin ............ G06F 17/218 |
| 2003/0088593 A1 | 5/2003 | Stickler |
| 2003/0115189 A1* | 6/2003 | Srinivasa .......... G06F 17/30699 |
| 2003/0126151 A1 | 7/2003 | Jung |
| 2003/0131007 A1 | 7/2003 | Schirmer et al. |
| 2003/0140045 A1 | 7/2003 | Heninger et al. |
| 2003/0140308 A1 | 7/2003 | Murthy et al. |
| 2003/0145047 A1 | 7/2003 | Upton |
| 2003/0163603 A1 | 8/2003 | Fry et al. |
| 2003/0167266 A1 | 9/2003 | Saldanha et al. |
| 2003/0167445 A1 | 9/2003 | Su et al. |
| 2003/0177118 A1 | 9/2003 | Moon et al. |
| 2003/0177341 A1 | 9/2003 | Devillers |
| 2003/0191849 A1 | 10/2003 | Leong et al. |
| 2003/0217033 A1 | 11/2003 | Sandler et al. |
| 2003/0217083 A1 | 11/2003 | Taylor |
| 2003/0218633 A1 | 11/2003 | Mikhail et al. |
| 2004/0060006 A1 | 3/2004 | Lindblad et al. |
| 2004/0122872 A1 | 6/2004 | Pandya et al. |
| 2005/0027658 A1 | 2/2005 | Moore et al. |
| 2005/0060345 A1 | 3/2005 | Doddington |
| 2005/0065987 A1 | 3/2005 | Telknowski et al. |
| 2007/0050467 A1* | 3/2007 | Borrett ............. G06F 17/30011 709/213 |
| 2007/0083497 A1* | 4/2007 | Martinez .......... G06F 17/30017 |
| 2008/0082929 A1* | 4/2008 | Stignani ........... G06Q 10/06 715/764 |
| 2008/0140616 A1* | 6/2008 | Encina ............. G06F 17/30864 |
| 2008/0306784 A1* | 12/2008 | Rajkumar .......... G06F 17/21 705/342 |
| 2009/0112678 A1* | 4/2009 | Luzardo ............ G06N 5/02 705/7.38 |
| 2009/0132537 A1* | 5/2009 | Denton ............. G06F 21/604 |
| 2010/0042642 A1* | 2/2010 | Shahraray ......... G06F 17/3082 707/756 |
| 2010/0131544 A1* | 5/2010 | Kilgour ............ G06Q 10/10 707/769 |

(56) References Cited

U.S. PATENT DOCUMENTS

| | | | |
|---|---|---|---|
| 2010/0250534 A1* | 9/2010 | Lee | G06F 17/30011 707/736 |
| 2011/0270878 A1* | 11/2011 | Sacco | G06F 17/30643 707/769 |
| 2013/0036348 A1* | 2/2013 | Hazard | G06F 17/2205 715/230 |
| 2013/0054610 A1* | 2/2013 | Zimmerman | G06F 17/30864 707/741 |
| 2014/0006951 A1* | 1/2014 | Hunter | H04H 60/31 715/719 |
| 2015/0220644 A1* | 8/2015 | Motoyama | G06F 16/9032 707/706 |
| 2016/0188568 A1* | 6/2016 | Srinivasan | G06F 17/2785 704/9 |

OTHER PUBLICATIONS

D.M. Hilbert et al, An approach to large-scale collection of application usage data over the internet (Abstract), Proc. 1998 Int'l Conf. Software Engineering, pp. 136-145 (Apr. 1998).

David S. Lindsay, RMF I/O Validation (Abstract), Proc. CMG XI Int'l Conf. Computer Performance Evaluation, (Dec. 1980), pp. 112-119.

Definition of "cache," Computer Dictionary Online, http:computer-dictionary-online.org (last visited 2007).

Definition of "cache," Microsoft Press Computer Dictionary (3rd ed. 1997).

Drake E. Lundell Jr. et al, Computer Use—An Executive's Guide (Abstract) (1973).

H.V. Jagadish et al, TAX: A Tree Algebra for XML, 2397 Lecture Notes in Computer Sci. pp. 149-164 (2002).

H.V. Jagadish et al, TIMBER: A Native XML Database, 11 Int'l J. Very Large Databases pp. 274-291 (2002).

Hakan Hacigumus et al, Executing SQL over Encrypted Data in the Database-Service-Provider Model, Proc. 2002 ACM SIGMOD Int'l Conf. Mgmt. Data, pp. 216-227 (2002).

Jason Tsong-Li Wang et al, A System for Approximate Tree Matching, 6 IEEE Trans. Knowledge and Data Engineering pp. 559-571 (Aug. 1994).

John D. Reed et al, A computer-to-computer conversion (Abstract), Datamation, Sep. 1973, at 63-67.

Joseph Hellerstein et al, Generalized Search Tree for Database Systems (Extended Abstract), Proc. 21st VLDB Conf. (1995).

Louise E. Moser, Transactions in a Distributed Object Environment, Final Report 1997-98 MICRO Project, pp. 97-122 (1998).

Maarten van Steen et al, A Model for Worldwide Tracking of Distributed Objects, Proc. TINA '96 (1996).

Mohammed J. Zaki, Efficiently Mining Frequent Tress in a Forest, 17 IEEE Trans. Knowledge and Data Engineering pp. 1021-1035 (Aug. 2005).

Monitor Client Library Programmer's Guide, http://manuals.sybase.com/onlinebooks/group-as/asg1250e/clilib/©Generic_BookTextView/47;pt=497 (last visited Dec. 8, 2006).

P. van Bommel et al, Genetic Algorithms for Optimal Logical Database Design, 36 Info. & Software Tech. 725 (1994).

Peter Pin-Shan Chen, The Entity-Relationship Model—Toward a Unified View of Data, 1 ACM Trans. Database Systems pp. 9-36 (Mar. 1976).

Philip H. Dorn, So you've got to get a new one (Abstract), Datamation, Sep. 1973, at 56-62.

Ralph Courtnay, Who pays what? Solution to the job-accounting quandary (Abstract), Computer Decisions, Jul. 1973, at 12-16.

Richard L. Nolan, Plight of the EDP manager (Abstract), 51 Harv. Bus. Rev. pp. 143-152 (May-Jun. 1973).

Robert H. Deng et al, A Probabilistic Approach to Fault Diagnosis in Linear Lightwave Networks, Proc. IFIP TC6/ WG6.6 3rd Int'l Symp. on Integrated Network Mgmt., pp. 697-708 (1993).

Robert Strom et al, Gryphon: An Information Flow Based Approach to Message Brokering, Int'l Symp. Software Reliability Engineering (1998).

S. Rao Kosaraju, Efficient Tree Pattern Matching, Proc. 30th Annual Symp. Foundations of Computer Science, pp. 178-183 (1989).

S.G. Linkman, Quantitative monitoring of software development by time-based andintercheckpoint monitoring, Software Engineering J., pp. 43-49 (Jan. 1990).

Shimin Chen et al, Improving Index Performance through Prefetching, ACM SIGMOD Rec., pp. 235-246 (Jun. 2001).

Shuyun Xu et al, ERDraw: An XML-based ER-diagram Drawing and Translation Tool, Proc. ISCA 18th Int'l Conf. Computers and Their Applications, pp. 143-146 (Mar. 2003).

Steve McConnel ed., Gauging Software Readiness with Defect Tracking, IEEE Software, May/Jun. 1997, at 135.

Tze-Jie Yu et al, An Analysis of Several Software Defect Models, 14 IEEE Trans. Software Engineering pp. 1261-1270 (Sep. 1988).

Warren F. McFarlan, Management audit of the EDP department (Abstract), 51 Harv. Bus. Rev. pp. 131-142 (May-Jun. 1973).

* cited by examiner

CLAUSE LIBRARY MANAGER

CROSS-REFERENCE TO RELATED APPLICATION

This application claims the benefit of U.S. Provisional Application No. 61/772,359, filed Mar. 4, 2013, titled "Legal Language Library Portal," which is hereby incorporated by reference herein in its entirety.

TECHNICAL FIELD

Implementations of the present invention relate to a marketplace, and more specifically, to managing a repository of clauses for use in the drafting of legal documents.

BACKGROUND

In the legal field, attorneys often look to previously negotiated contracts to find desired language, legal terms or concepts, etc. when drafting legal documents. The leveraging of previously negotiated legal language is useful when negotiating a contract with a counterparty with whom the attorney has had previous dealings, as referring back to prior contracts is helpful in determining provisions were agreeable to the particular counterparty. Typically, identifying prior agreements or previously agreed upon clauses requires a laborious physical or manual search of executed contracts or the performance of an ad hoc electronic search for specific terms in an unorganized collection of documents distributed and de-centralized across a company or firm's file storage system. These searches are extremely time-consuming, particularly in larger companies having thousands of agreements, contracts, and other legal documents including many similar, yet differing, provisions and/or contracting parties.

SUMMARY

Methods and systems for managing and maintaining a library including organized categories of legal clauses, language, provisions, contractual terms, etc. (referred to collectively as a "clause" or "clauses") for access by a user in a network computing environment. A clause library management system is configured to manage a repository (referred to as a "clause library") including clauses grouped into a collection of categories for efficient and accurate searching, updating, categorizing, and accessing by users. The multiple clauses maintained in the clause library may each have a profile associated therewith (referred to as a "clause profile"). The clause profile includes information identifying the associated clause. In an implementation, one or more ratings may be associated with each of the clauses maintained in the clause library. The rating may represent a risk level associated with the clause (e.g., a measure of a risk or level of exposure the clause presents to a contracting party) and/or an efficacy level (e.g., a measure of the success in adoption, acceptance, and/or inclusion of the clause in executed and/or finalized agreements).

The clause library management system enables a user to search the clause library to identify one or more candidate clauses that meet criteria established by the user. The user may search the clause library, identify the candidate clauses for potential use in connection with a current event (e.g., an agreement, negotiation, project, proposal, draft, etc.), and provide feedback (e.g., comments) regarding the candidate clauses (e.g., feedback regarding the use of the candidate clause in an actual agreement/negotiation). Advantageously, the clause library management system provides an efficient, scalable, and interactive system for identifying clauses in connection with the preparation of legal documents.

In an implementation, the rating associated with a clause may be established, modified, adjusted, updated or revised based on feedback received from one or more users in a "crowd sourcing" or social media ranking environment. In this implementation, the clause rating may be modified as a result of consideration of comments, scores, rating information, etc. received from users.

DETAILED DESCRIPTION

Figure 1:
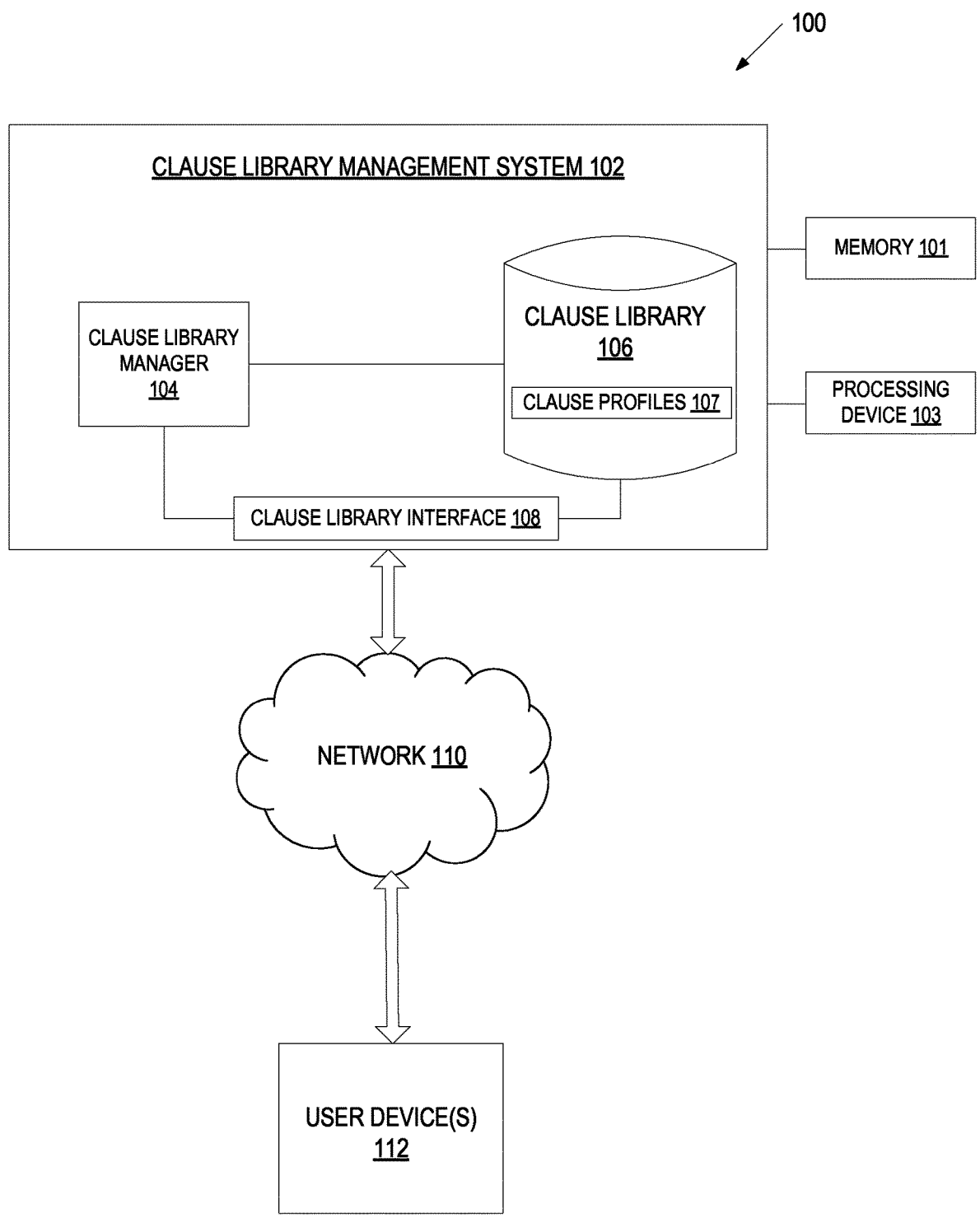
FIG. 1 is a block diagram of an exemplary network architecture in which implementations of the disclosure may operate.

FIG. 1 is a block diagram of exemplary clause library management system 102 configured for interaction with one or more user devices 112 via a network 110 within a computing environment 100. The network 110 may include any suitable communications network including, but not limited to, a public network such as the Internet, a private network such as a local area network (LAN), or a virtual private network (VPN)). The user devices 112 may include any type of computing device such as, for example, a desktop computer, a portable digital assistant, a mobile phone, a laptop computer, a portable media player, a tablet computer, a netbook, a notebook, or a personal computer.

The clause library management system 102 maintains and manages a clause library 106 including multiple clauses having associated clause profiles 107. In an implementation, the clause library management system 102 includes a clause library manager 104 communicatively connected to the user devices 112 via a clause library interface 108. The clause library interface 108 may include any suitable portal or graphical user interface (GUI) configured to enable a user device 112 to communicate and interact with the components of the clause library management system 102.

According to implementations of the present disclosure, the clause library manager 104 creates, updates, modifies, and manages the clause profiles 107 stored in the clause library 106. The clause profiles 107 may include any suitable information identifying the associated clause, including, but not limited to, a clause name or category (e.g., "termination," "non-solicitation," "employment agreements," "non-disclosure," "vendor facing," "customer facing," "license terms," etc.), a clause definition (e.g., a description of a meaning/purpose of the clause), an agreement identifier associated with each of the one or more agreements in which the clause has been used, party identifiers associated with the parties to agreements including the clause, ratings (e.g., a risk level rating, an efficacy rating, etc.), a history associated with the clause (e.g., a revision history), comments relating to the clause received from users, user information associated with the clause (e.g., identifying information associated with the user who entered the clause into the clause library 106, identifying information associated with one or more users who have incorporated the clause into an agreement, identifying information associated with one or more users submitting comments regarding the clause, etc.), dates associated with the submission, update, receipt of comments on, and/or use of the clause, and/or other suitable information for identifying the clause. The components of the clause profile 107 may be established as "tags" for use in matching search criteria submitted by a user seeking to identify one or more clauses maintained in the clause library 106.

According to implementations of the present disclosure, the clause library manager 104 is a software component (e.g., a set of instructions residing in a memory 101) executable by a processing device (e.g., processing device 103) to perform the clause library management activities described herein (e.g., the methods described in detail in connection with FIGS. 2 and 3). Memory 110 may be any suitable computer readable storage medium, including volatile memory devices (e.g., random access memory (RAM)), non-volatile memory devices (e.g., flash memory), a magnetic hard disk, a Universal Serial Bus (USB) solid state drive, etc., a local disk, an external disk, and/or other types of memory devices).

According to implementations of the present disclosure, the clause library manager 104 is configured to receive and collect information associated with actions performed by one or more users with respect to the clauses in the clause library. User actions may include, but are not limited to, the submission of feedback and/or comments regarding a clause, a view of a clause, a download or use of a clause, an e-mail or communication associated with a clause, a rating of a clause, a modification of a clause, a subscription request associated with a clause, an upload or other submission of a document including one or more clauses, an upload or submission of one or more clauses, and/or a search of a clause.

In implementations of the present disclosure, the clause library manager 104 is configured to determine a rating for a clause. The rating may be based on data provided by a user or system manager, rules algorithms, etc. In an implementation, a clause may be rated based on a consideration of any number of factors, including a "right" or legal concept associated with the clause and an "obligation" associated with the clause. In an implementation, the rating is derived as a function of the right(s) and obligations associated with the clause. In an example, if a given clause presents a high level of obligation to a particular party (e.g., increased responsibilities and/or higher risk of non-performance of those responsibilities) with a low level of corresponding rights being granted to the particular party (e.g., a benefit pursuant to the clause), then the clause may be assigned a "high risk" or "least favorable" rating from the particular party's perspective.

In another example, if a clause reduces or limits an obligation of the particular party and provides a high level of rights to the particular party, then the clause may be assigned a "favorable" or "most favorable" rating.

Any suitable rating may be determined, including, but not limited to, a risk rating representing a level of risk associated with the clause. For example, risk rating categories may be assigned to a clause, such as, "most favorable," "moderately favorable," and "least favorable," from user's perspective as a contracting party.

Although illustrated as being a local or integrated component of the clause library management system 102, one having ordinary skill in the art will appreciate that the clause library 106 may be remote from the clause library management system 102 and/or clause library manager 104 and may be communicatively connected via any suitable communicative connection.

Figure 2:
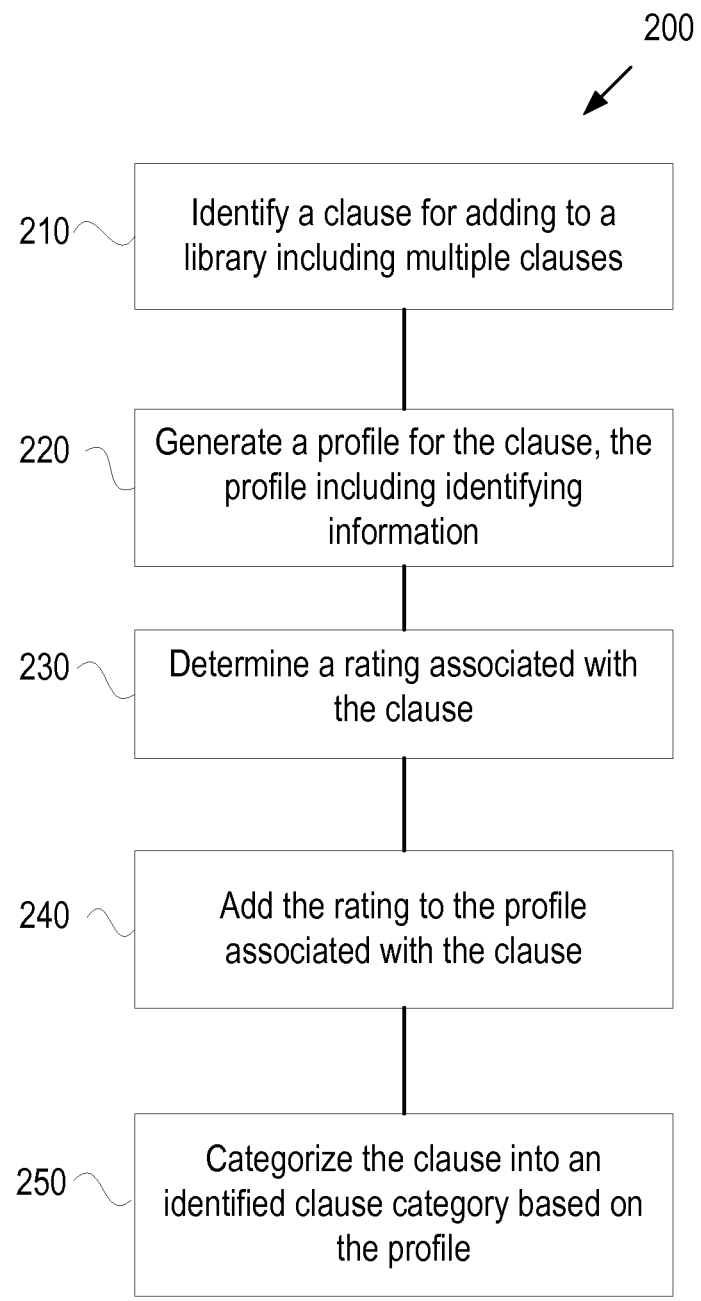
FIG. 2 is a flow diagram of an exemplary method for managing a clause library, according to implementations of the present disclosure.

FIG. 2 is a flow diagram of exemplary implementations of a method 200 for managing a clause library. The method is performed by processing logic that may comprise hardware (circuitry, dedicated logic, etc.), software (such as is run on a general purpose computer system or a dedicated machine), or a combination of both. In one implementation, the method is performed by a computing system (e.g., clause library management system 102 of FIG. 1).

Referring to FIG. 2, method 200 begins with identifying a clause for adding to a clause library, in block 210. The clause library is configured to include multiple clauses in an indexed, categorized, and searchable data structure. In block 210, the clause library manager may identify the clause for inclusion in the clause library through any suitable technique, including but not limited to, based on a communication from a user requesting the addition of the clause to the library. In another implementation, the clause may be identified by the system based on review and/or scan of a document (e.g., an agreement uploaded to the clause library management system). In an implementation, the clause or document identified for inclusion in the clause library may be "scrubbed" to remove reference to certain information (e.g., a party name, a draftsperson's name, confidential information, sensitive information, etc.) prior to inclusion in the clause library. In an implementation, a user may be required to login to the clause library management system (e.g., using a username and password). In addition, any suitable security measures and/or preferences may be established, such that a certain user may be granted restricted access to view designated categories, folders, clauses, comments, etc. and/or restricted to perform only certain designated actions (e.g., view only, prohibited from commenting or rating, blocked from deleting or adding a clause, etc.).

In block 220, a clause profile is generated for the clause identified in block 210. The clause profile is configured to include information identifying the associated clause, including, but not limited to, the exemplary components of the clause profile identified above.

In block 230, a rating associated with the clause is determined. In implementations, the rating may be a numerical or symbolic score or measure of an aspect of the clause, such as the clause's risk level and/or efficacy. In an implementation, the rating may represent an efficacy or 'success' ranking representing a measure of success of the clause in previously negotiated events. In an implementation, the rating may represent a risk level or measure of risk or exposure associated with the clause. The one or more ratings advantageously provide other users with additional information for use when considering whether to employ the clause in a current event (e.g., preparation of a document, a negotiation, etc.). In block 240, the determined rating(s) are added to the clause profile and may be used as a 'tag' to enable a user to search for a clause based on the rating information.

According to implementations of the present disclosure, the rating may be assigned or determined based at least in part on information collected from a user. In implementations, the system may implement a ratings formulation algorithm configured to receive inputs from one or more users relating to components of the clause profile and determine a rating based thereon. In an implementation, a determined rating may be modified, updated, adjusted, changed or altered in view of feedback received from the one or more users. In this regard, a rating may change over time as the associated clause is employed in connection with actual events. For example, a clause may have a first risk rating indicating that the clause presents a "high risk level" from the perspective of a customer in an asset licensing agreement with a vendor. In this example, comments from multiple users relating to their use of the clause in negotiated agreements may result in the adjustment of the initial risk rating to a "moderate risk level".

In block 250, the clause is categorized into an identified clause category based on the clause profile. The clause library may maintain any suitable number of different clause categories and sub-categories. The clause categories and sub-categories may be structured in order to group like clauses to enable for efficient searching of the clause library and consideration of similar candidate clauses by a user following a search. Exemplary categories may be defined based on one or more of the following: a clause type (e.g., confidentiality, term and termination, software license terms, etc.), an agreement type (e.g., employment contract, software license, etc.), a party type (e.g., customer, vendor, licensee, licensor, employer, employee, etc.), a party name (e.g., a category including clauses employed in agreements with Company ABC, a category including clauses employed in agreements with Company XYZ, etc.), a risk level rating (e.g., clauses having a low risk level, clauses having a moderate risk level, clauses having a high risk level, etc.), an efficacy or success rating (e.g., clauses having a high acceptance or adoption rate, clauses having a moderate acceptance or adoption rate, clauses having a low acceptance or adoption rate, etc.).

Figure 3:
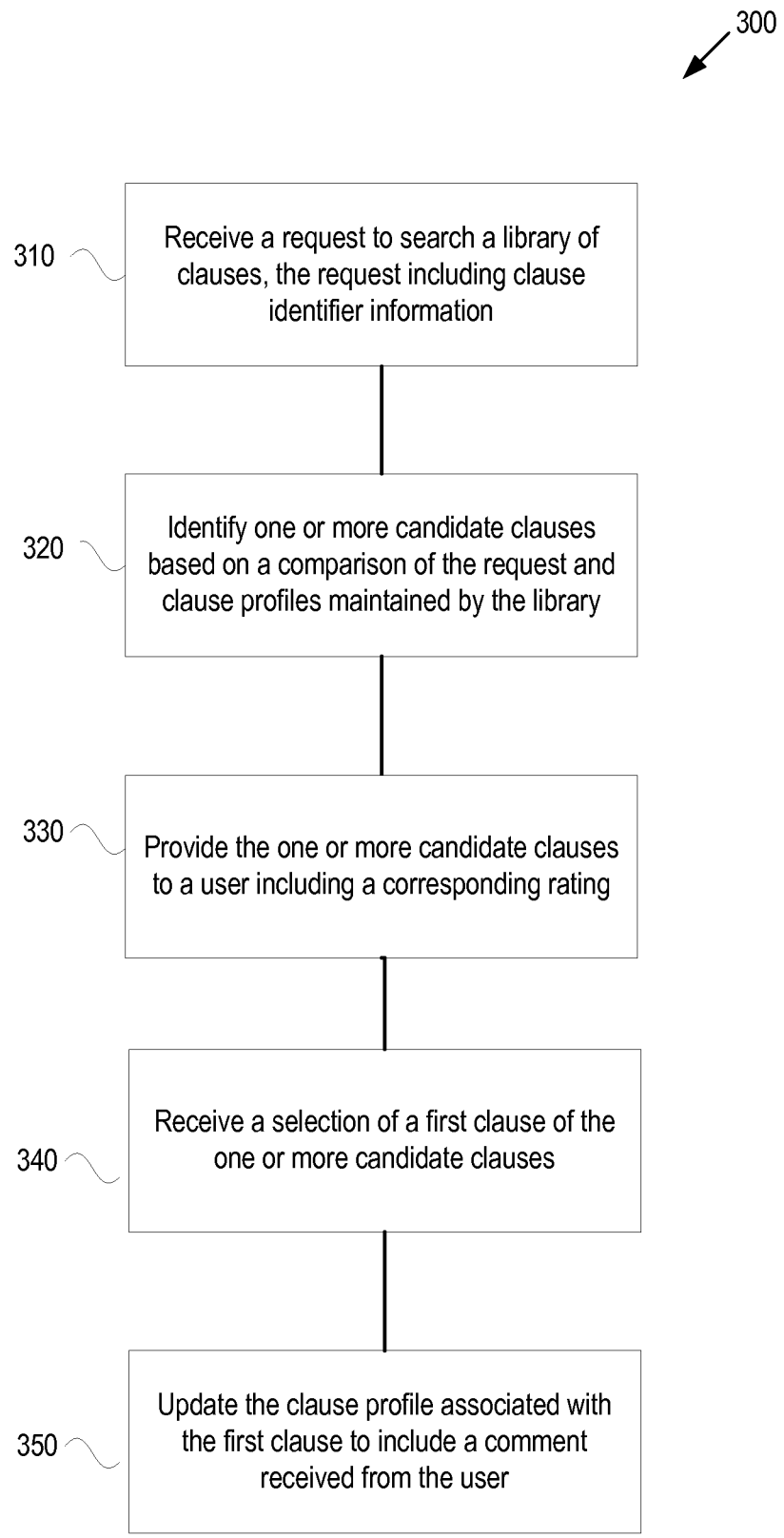
FIG. 3 is a flow diagram of an exemplary method for managing user interactions with a clause library, according to implementations of the present disclosure.

FIG. 3 illustrates an exemplary method 300 for managing a clause library, according to implementations of the present disclosure. In block 310, a clause library management system (e.g., clause library management system 102) receives a request to search a clause library. The search request includes search criteria (referred to as "clause identifier information") for use by the system in identifying one or more clauses maintained in the clause library. In an implementation, the clause identifier information provided in the search request may relate to any of the components of the clause profiles associated with the clauses stored in the clause library and/or the categories or subcategories within the organized structure of the clause library. In an implementation, a user interface provided by the clause library management system may include search fields and selectable search terms to the user in order to collect the search request and corresponding clause identifier information. The search terms may be associated with the tags corresponding to the components of the clause profile in order to identify the one or more clauses which satisfy the search criteria. In an implementation, a user may use a full text search for association with text within a clause, agreement, or other document maintained in the clause library. In an implementation, the search request may include any suitable context data (e.g., descriptions, keywords, a name of an agreement, a party name, a draftsperson's name, etc.) for association with the clause profiles stored in the clause library.

In block 320, the clause library management system identifies one or more candidate clauses based on a comparison of the search request and the clause profiles maintained in the clause library. It is noted that any suitable searching technique may be employed in identifying candidate clauses satisfying the submitted search criteria. Upon identification of the candidate clauses, the clause library management system presents the one or more candidate clauses to the user, in block 330. In an implementation, the one or more candidate clauses are presented to the user with their corresponding rating. In an implementation, the one or more candidate clauses may be presented with a display of the iterations or revisions to the clause. For example, if an adverse party made changes to a clause, the clause library management system may provide the user with the initial version and the revised version for comparison purposes. In implementations, the revised version of the clause may be displayed to the user in a manner enabling the user to efficiently identify the changes that were implemented (e.g., in a red-line format). The revisions to the clause may be associated with the revising party, any comments associated with a revision, etc. Advantageously, the clause library may maintain a historical record associated with the use of a clause in the context of one or more particular agreements, and enable a user to review the historical record associated with a clause (e.g., party names, agreement types, proposed changes, rejected changes, accepted changes, comments, etc.).

In block 340, the clause library management system may receive a selection of one of the candidate clauses (also referred to as a "first clause"). It is noted that multiple clauses may be selected by the user from the list of candidate clauses. The selection of the one or more clauses may include any suitable corresponding action, such as, for example, viewing the clause profile associated with the clause, printing the clause, downloading the clause, communicating the clause (e.g., e-mailing, instant messaging, etc.), copying the clause, pasting the clause, expanding the clause, subscribing to the clause, etc. In an implementation, the clause library management system may present the user with a link to the respective candidate contract clauses to enable the user to return to the particular clause or share the clause with another user. In an implementation, the user may interact with a candidate clause in order to view the candidate clause in the context of the one or more actual agreements in which the clause has previously been employed. In an implementation, the user may subscribe to a particular clause such that the user is notified (e.g., via e-mail) of any actions or updates associated with the clause, such as, the addition of a new comment, a change in the clause's rating, a revision to the clause in one or more active agreements, etc.

In block 350, the clause library management system provides the user with an interface for submission of one or more comments relating to a clause. In an implementation, the comment may be submitted in a comment field, selected from a list of potential comments, submitted via a "like" or "dislike" button, or any other suitable method of receiving and collecting feedback relating to a clause. In an implementation, a user may interact with previously submitted comments relating to a clause. For example, a user may identify another user's comments as important, move another user's comments to a top of a comment list, send a question or comment regarding another user's comment to the other user (e.g., initiate a dialog with the other user via the other user's comment). In an implementation, the "crowd sourced" feedback received from one or more users may be used to adjust, modify, update, alter, re-calculate, and/or otherwise impact a rating associated with a clause. In an example, an existing rating associated with a clause may be changed based on feedback (e.g., a comment, a "like" or "dislike" vote or indication) from users. In this regard, the clause rating may be established based at least in part on user feedback collected in a social media-like environment.

In block 350, the clause library management system may update the clause profile associated with the selected clause (or clauses) to include the one or more comments received from the user. As noted above, the one or more comments received from the user may be used to adjust, update, modify, or otherwise change an existing rating associated with the selected clause.

In an implementation, the clause library management system tracks information associated with user interactions or feedback information associated with a clause. According to implementations of the present disclosure, the tracking information may include, but is not limited to, a number of views of a clause, a number of downloads of a clause, a number of communications relating to the clause (e.g., e-mails, instant messages, etc.), a number and nature of comments associated with the clause, etc. In an implementation, the tracking information may be used to determine a popularity, an efficacy, a risk level, or other ranking of the clause. In an implementation, the tracking information may be provided to a user in connection with the presentation of a clause, via a report, etc.

Figure 4:
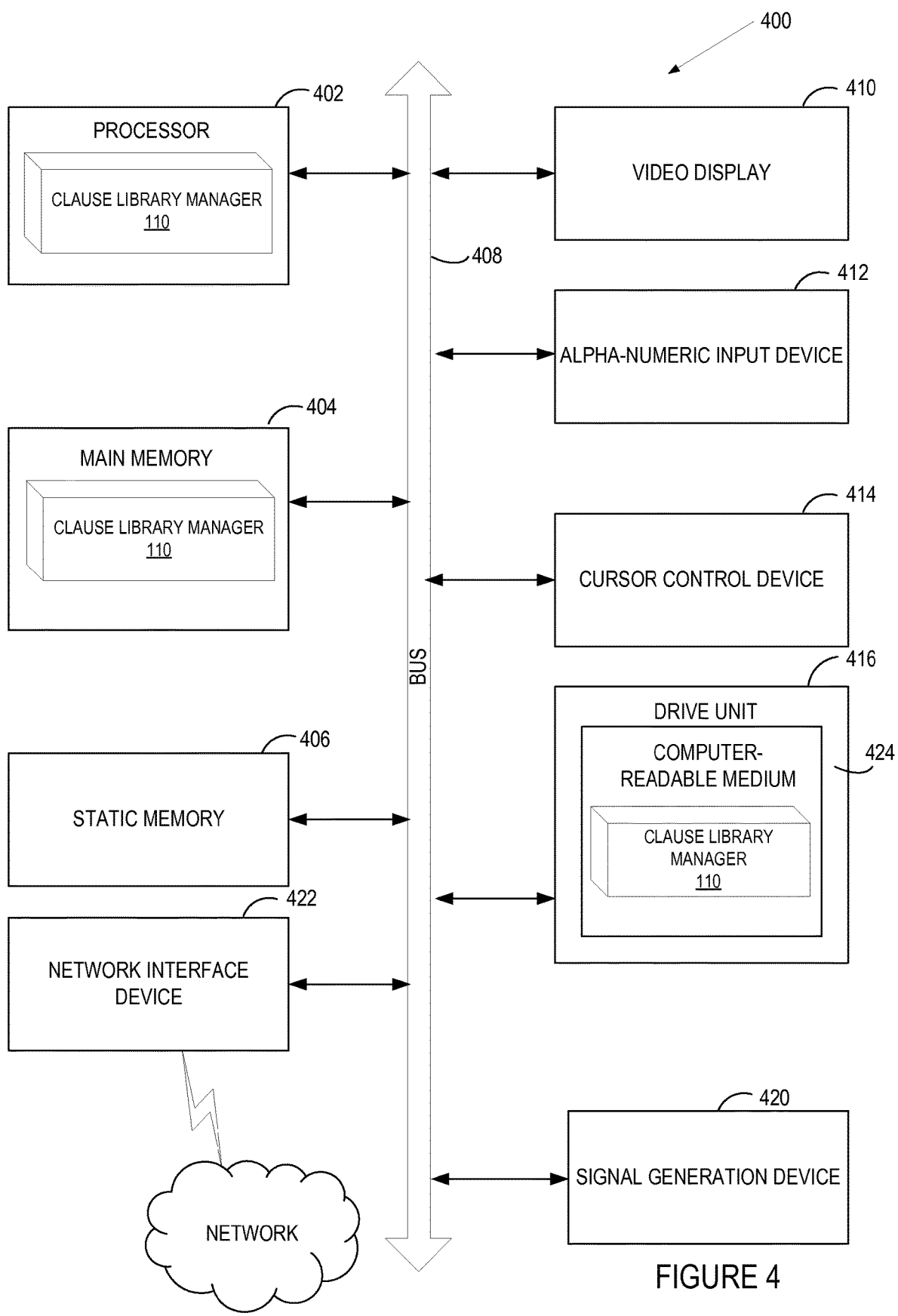
FIG. 4 illustrates an exemplary clause library management system.

FIG. 4 illustrates an exemplary clause library management system 400 in the form of a computer system within which a set of instructions, for causing the machine to perform any one or more of the methodologies discussed herein, may be executed. In some implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary clause library management system 400 includes a processing device (e.g., processor) 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 406.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The clause library management system 102 in FIG. 1 may comprise processor 402 configured to perform the operations and steps discussed herein, including, but not limited to, the operations of the clause library manager 110.

The clause library management system 400 may further include a network interface device 422. The IP exchange system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

A drive unit 416 may include a computer-readable medium 424 on which is stored one or more sets of instructions (e.g., instructions of the clause library management system 102, including but not limited to the instructions relating to the operations of the clause library manager 110) embodying any one or more of the methodologies or functions described herein. The instructions of the clause library management system 102 may also reside, completely or at least partially, within the main memory 404 and/or within the processor 402 during execution thereof by the IP exchange system 400, the main memory 404 and the processor 402 also constituting computer-readable media. The instructions of the clause library management system 102 (including, but not limited to, the instructions relating to the operations of the clause library manager 110) may further be transmitted or received over a network via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the above description, numerous details are set forth. It will be apparent, however, to one of ordinary skill in the art having the benefit of this disclosure, that implementations of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "adding," "categorizing," "managing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

For explanation purposes, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The terms "first", "second", "third", "fourth", etc. as used herein are meant as labels to distinguish among different elements and may not necessarily have an ordinal meaning according to their numerical designation.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method for developing a clause library repository searchable by users to identify clauses for inclusion in a current document, the method comprising:

identifying, by a computing device, a clause for inclusion in the clause library repository including a plurality of clauses; and generating, by the computing device, a clause profile for the clause, wherein the clause profile includes identifying, by the computing device, information associated with the clause, the identifying information including a plurality of tags enabling matching with search criteria entered by the users;

determining, by the computing device executing a ratings formulation algorithm configured to receive inputs from the users, a rating and a type associated with the clause, wherein the rating includes (i) a first numerical score associated with an assessed measure of a risk level of using the clause in previously negotiated events, the risk level assessing a level of exposure determined from the perspective of the customer, and (ii) a second numerical score associated with a determined effectiveness ranking of the clause in previously negotiated events;

adding, by the computing device, the rating, including the first numerical score and the second numerical score, to the clause profile associated with the clause, wherein components of the clause profile, including the first numerical score and the second numerical score of the rating, function as tags for matching with the search criteria entered by users;

categorizing, by the computing device, utilizing a clause library manager, the clause into a clause category in the clause library repository based on the clause profile; and providing, by the computing device, a clause library interface, including a portal having a user interface including search fields enabling the users to communicate with the clause library manager to search and modify the clause library repository, wherein the search terms are matched with the tags in order to identify at least one matching clause.

2. The method of claim 1, further comprising:

receiving, by the computing device, a request to search the library from a user, the request including one or more search terms;

identifying, by the computing device, one or more candidate clauses based on a comparison of the one or more search terms and one or more clause profiles maintained by the library; and providing, by the computing device, the one or more candidate clauses to the user.

3. The method claim 2, further comprising:
receiving, by the computing device, a selection of a first clause of the one or more candidate clauses;
receiving, by the computing device, a comment associated with the first clause from the user; and
updating, by the computing device, the clause profile associated with the first clause to include the comment received from the user.

4. The method of claim 3, further comprising:
updating, by the computing device, the rating based on the comment received from the user.

5. A non-transitory computer-readable storage medium that includes instructions for developing a clause library repository searchable by users to identify clauses for inclusion in a current document, the method, that when executed by a processing device, causes the processing device to perform operations comprising:
identifying a clause for inclusion in the clause library repository including a plurality of clauses; and
generating a clause profile for the clause, wherein the clause profile includes
identifying information associated with the clause, the identifying information including a plurality of tags enabling matching with search criteria entered by the users;
determining, by the processing device executing a ratings formulation algorithm configured to receive inputs from users, a rating and a type associated with the clause, wherein the rating includes (i) a first numerical score associated with an assessed measure of a risk level of using the clause in previously negotiated events, the risk level assessing a level of exposure determined from the perspective of the customer, and (ii) a second numerical score associated with a determined effectiveness ranking of the clause in previously negotiated events;
adding the rating, including the first numerical score and the second numerical score, to the clause profile associated with the clause, wherein components of the clause profile, including the first numerical score and the second numerical score of the rating, function as tags for matching with the search criteria entered by users;
categorizing, using a clause library manager executed by the processing device, the clause into a clause category in the clause library repository based on the clause profile; and
providing a clause library interface including a portal having a user interface including search fields enabling the users to communicate with the clause library manager to search and modify the clause library repository, wherein the search terms are matched with the tags in order to identify at least one matching clause.

6. The non-transitory computer-readable storage medium of claim 5, the operations further comprising:
receiving a request to search the library from a user, the request including one or more search terms;
identifying one or more candidate clauses based on a comparison of the one or more search terms and one or more clause profiles maintained by the library; and
providing the one or more candidate clauses to the user.

7. The non-transitory computer-readable storage medium of claim 6, the operations further comprising:
receiving a selection of a first clause of the one or more candidate clauses;
receiving a comment associated with the first clause from the user;
updating the clause profile associated with the first clause to include the comment received from the user; and
updating the rating based on the comment received from the user.

8. A computing device, comprising:
a processor; and
a memory, wherein the memory is coupled to the processor that is configured to execute programmed instructions stored in the memory, the instructions including
identifying a clause for inclusion in the clause library repository including a plurality of clauses; and
generating a clause profile for the clause, wherein the clause profile includes
identifying information associated with the clause, the identifying information including a plurality of tags enabling matching with search criteria entered by the users;
determining, by the processor executing a ratings formulation algorithm configured to receive inputs from the users, a rating and a type associated with the clause, wherein the rating includes (i) a first numerical score associated with an assessed measure of a risk level of using the clause in previously negotiated events, the risk level assessing a level of exposure determined from the perspective of the customer, and (ii) a second numerical score associated with a determined effectiveness ranking of the clause in previously negotiated events;
adding the rating, including the first numerical score and the second numerical score, to the clause profile associated with the clause, wherein components of the clause profile, including the first numerical score and the second numerical score of the rating, function as tags for matching with the search criteria entered by users;
categorizing, using a clause library manager executed by the processing device, the clause into a clause category in the clause library repository based on the clause profile; and
providing a clause library interface, including a portal having a user interface including search fields enabling the users to communicate with the clause library manger to search and modify the clause library repository, wherein the search terms are matched with the tags in order to identify at least one matching clause.

9. The device as set forth in claim 8,
wherein the processor is further configured to execute additional instructions, including
receiving a request to search the library from a user, the request including one or more search terms;
identifying one or more candidate clauses based on a comparison of the one or more search terms and one or more clause profiles maintained by the library; and
providing the one or more candidate clauses to the user.

10. The device as set forth in claim 8,
wherein the processor is further configured to execute additional instructions, including
receiving a selection of a first clause of the one or more candidate clauses;
receiving a comment associated with the first clause from the user;

updating the clause profile associated with the first clause to include the comment received from the user; and updating the rating based on the comment received from the user.

\* \* \* \* \*